Nov. 16, 1965  C. E. HALLMARK ETAL  3,218,443
AUTOMATIC ANALOG MATRIX COMPUTER
Filed April 16, 1962  5 Sheets-Sheet 3
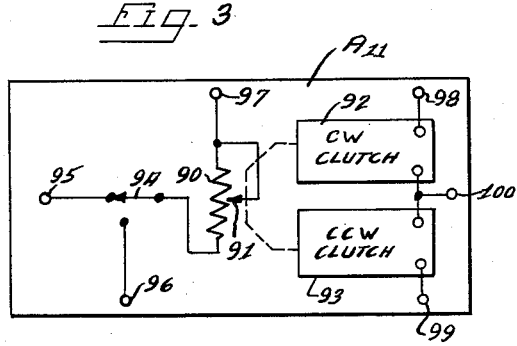
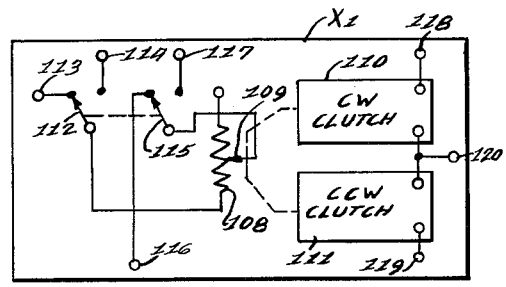
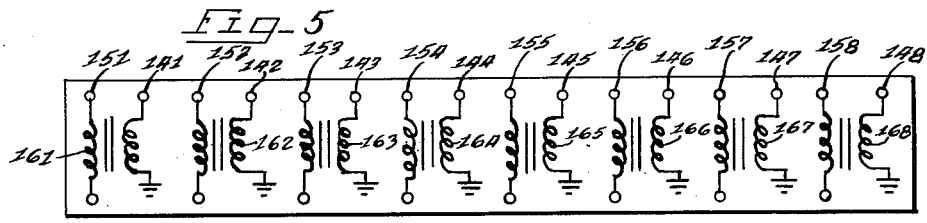
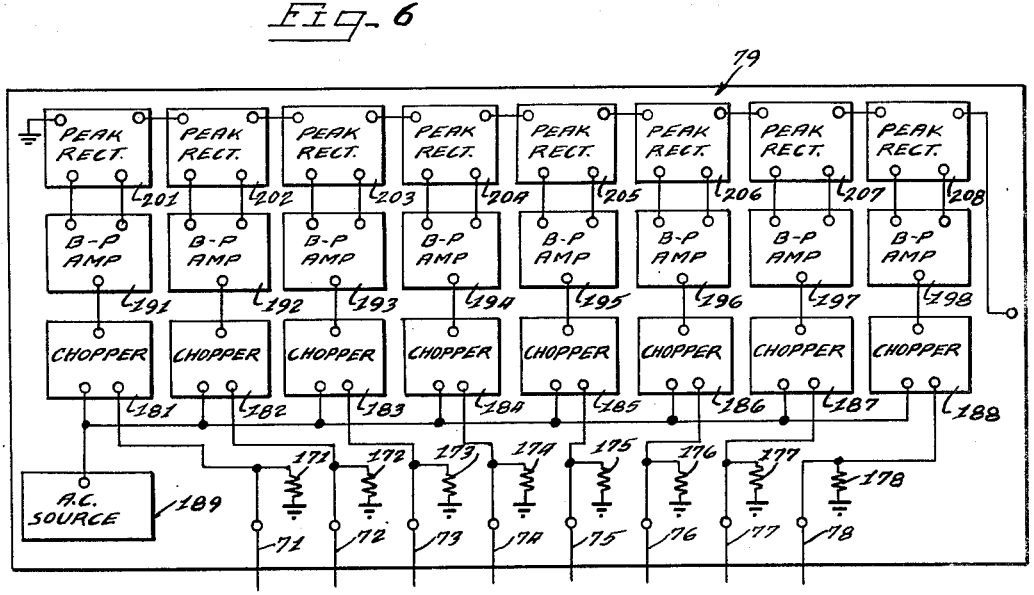
INVENTORS
Clyde E. Hallmark
BY Richard E. Martin
ATTORNEYS Nov. 16, 1965       C. E. HALLMARK ETAL       3,218,443
           AUTOMATIC ANALOG MATRIX COMPUTER
Filed April 16, 1962                     5 Sheets-Sheet 4
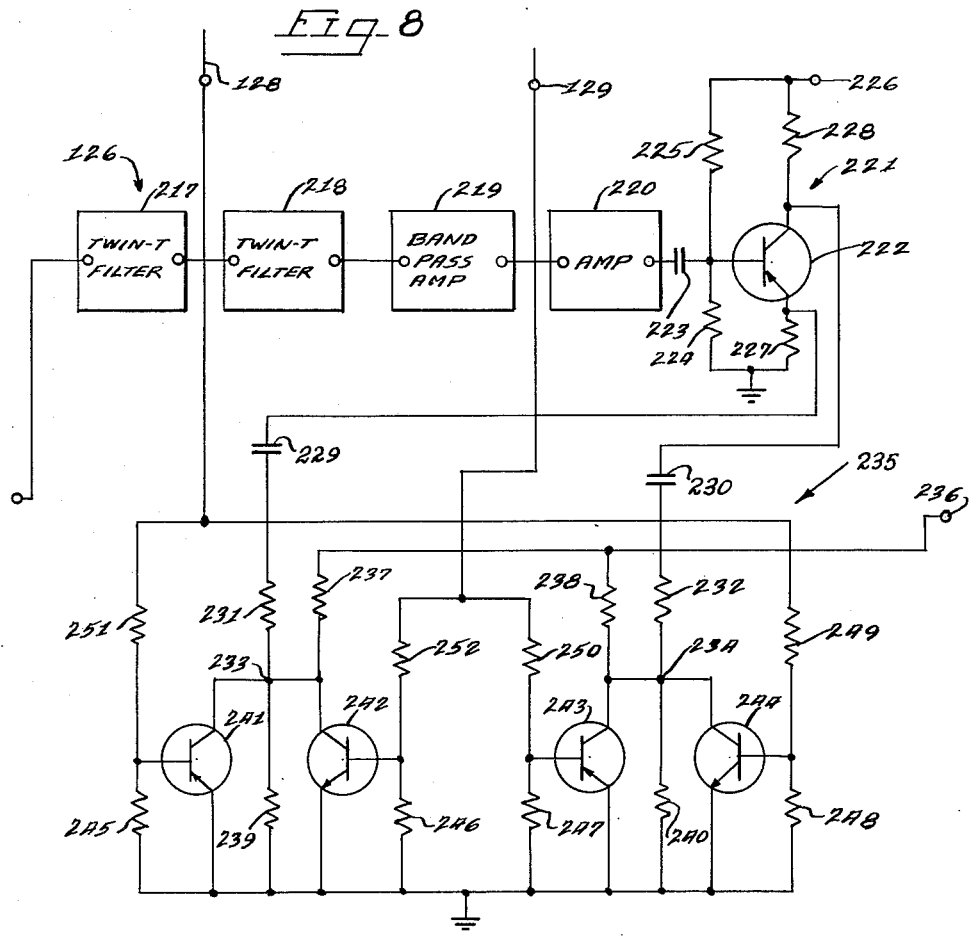
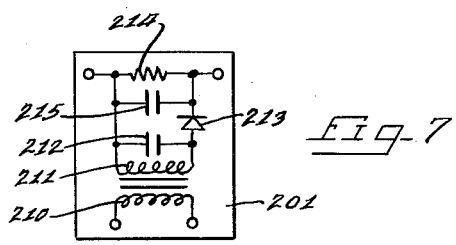
INVENTORS
Clyde E. Hallmark
Richard E. Martin
BY
ATTORNEYS

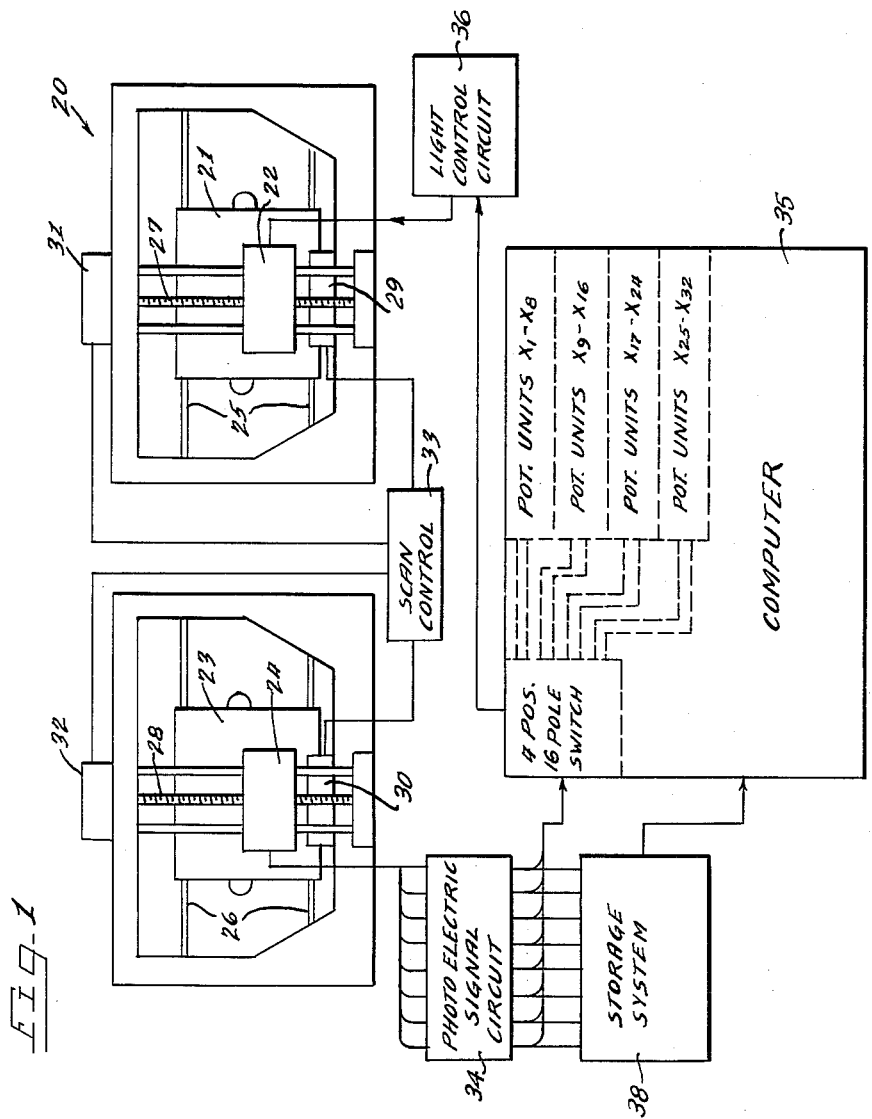

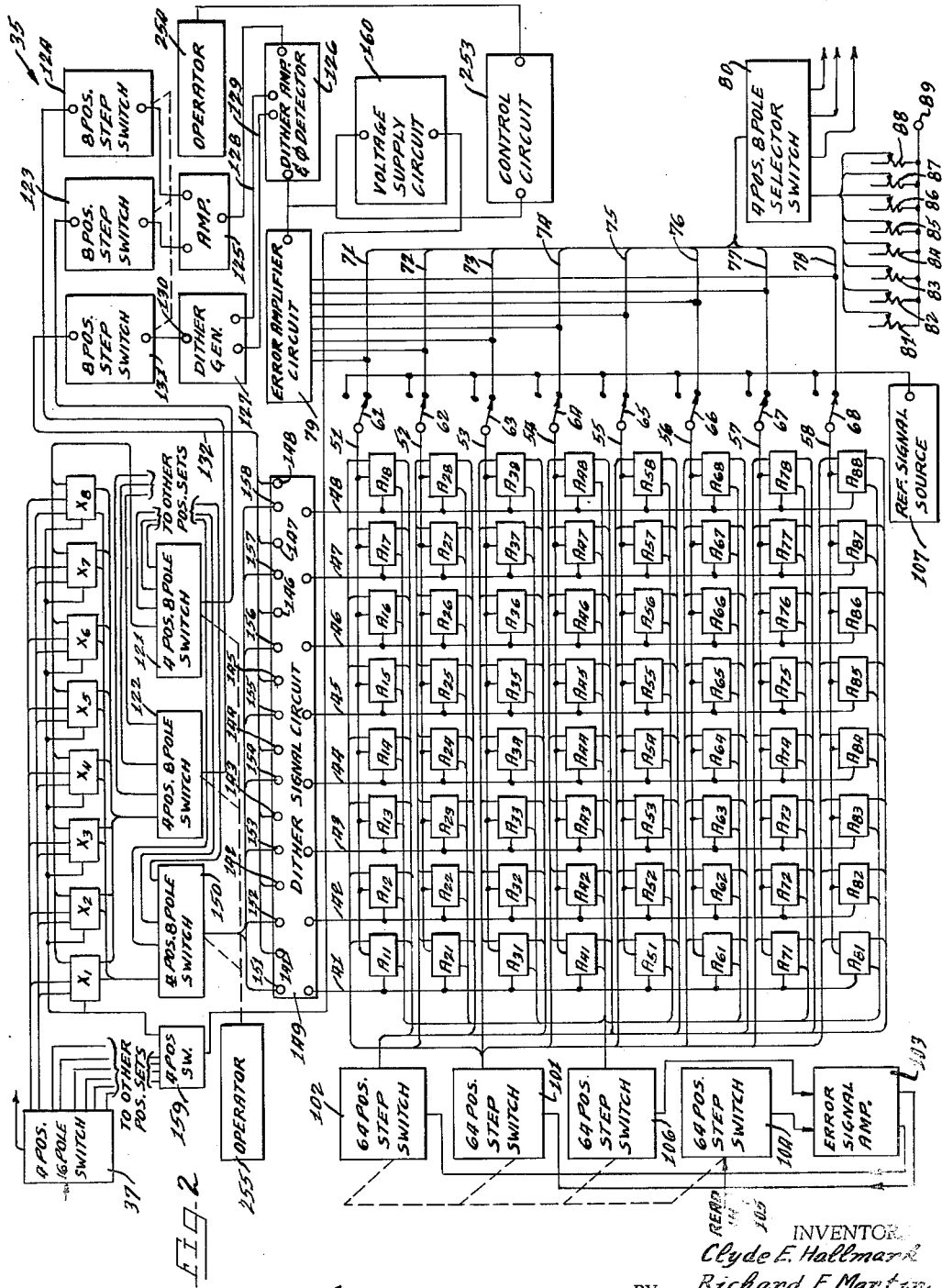

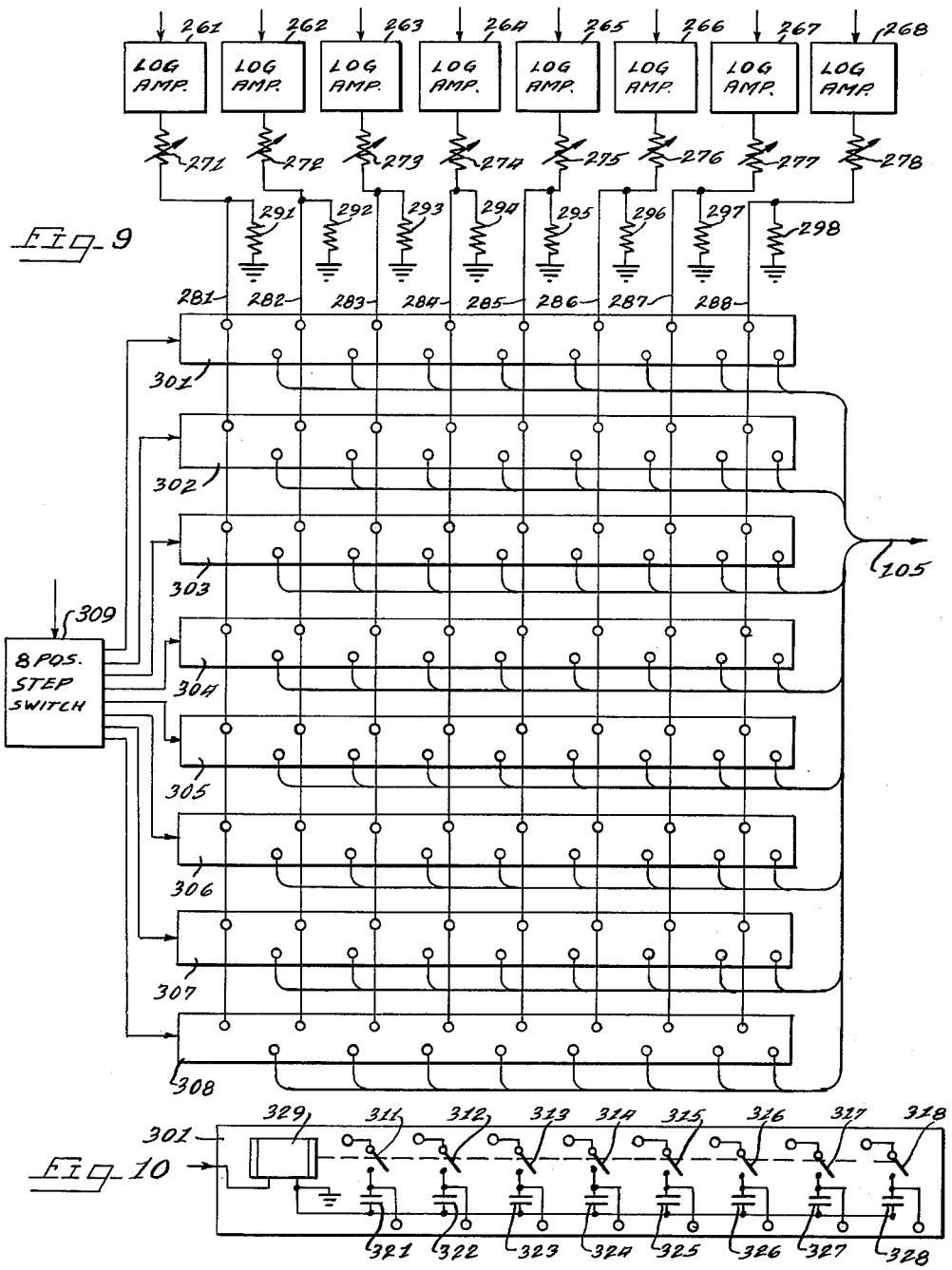

United States Patent Office 3,218,443
Patented Nov. 16, 1965

3,218,443
AUTOMATIC ANALOG MATRIX COMPUTER
Clyde E. Hallmark, Michigan City, and Richard E. Martin, South Bend, Ind., assignors to TRW Inc., a corporation of Ohio
Filed Apr. 16, 1962, Ser. No. 187,834
11 Claims. (Cl. 235—180)

This invention relates to an automatic analog matrix computer which was designed for a system used for plate making in color printing but which is usable in a wide variety of applications.

The computer comprises a matrix of adjustable resistance or potentiometer units which, for purposes of discussion, may be considered as being arranged in a certain number of horizontal rows in an equal number of vertical columns. These units may be adjusted in accordance with the constant terms of a set of linear matrix equations.

The constant term units of each vertical column are connected to an adjustable "variable term" potentiometer unit which controls application of a voltage to all of such constant term units. The constant term units of each horizontal row are connected to an output line which may be connected to an adjustable current source, and an error signal is developed from each horizontal row corresponding to any unbalance between the current of the adjustable current source and a current equal to the sum of the products of voltages from the variable term units and the conductances of the constant term units of that row.

According to this invention, means are provided for automatically responding to such error signals to adjust the variable term units to positions at which all error signals are reduced to zero, or substantially so, and to thereby solve the equations entered into the computer.

An important feature of the invention relates to the use of the computer in an "off-line" computing mode followed by its use in an "in-line" operational mode to control operation in a system such as a color printing, plate making system. In accordance with this feature, the variable term potentiometer units, after being adjusted to provide a solution of the equations, are switched into an operational circuit. This is highly advantageous in that it greatly reduces the number of required components and greatly reduces the possibility of error which might otherwise result in read-in and read-out. It provides greater accuracy and at the same time does not require precision components.

Another important feature relates to a system for obtaining an error signal representative of the total of the absolute values of the individual error signals, the composite error signal being used in automatically adjusting the variable term units. With this feature, it is possible to solve a great many equations of a practical nature which could not otherwise be solved.

A further feature of the invention relates to a circuit referred to herein as a "dither" circuit which automatically determines the direction in which a variable term unit must be moved to bring the equations closer to a solution, and to the automatic adjustment of the variable term units from that circuit.

A still further feature of the invention relates to a system for automatically adjusting the constant term potentiometers in accordance with input information. Such input information may be obtained directly from the system which is controlled by the computer.

Additional features of the invention relate to the combination of the computer in a color printing, plate making system, and to the construction and arrangement of components in circuit in a manner to minimize the required number of component parts and to obtain accurate, reliable, efficient and trouble-free operation.

These and other objects, features and advantages of the invention will become more fully apparent from the following detailed description taken in conjunction with the accompanying drawings which illustrate a preferred embodiment and in which:

FIGURE 1 is a diagrammatic view of a color correction system using a computer constructed according to this invention;

FIGURE 2 is a block diagram of the computer used in the system of FIGURE 1;

FIGURE 3 diagrammatically illustrates a constant term potentiometer unit of the computer of FIGURE 2;

FIGURE 4 diagrammatically illustrates a variable term potentiometer unit of the computer of FIGURE 2;

FIGURE 5 is a circuit diagram of a dither signal circuit of the computer of FIGURE 2;

FIGURE 6 is a circuit diagram of an error signal amplifier circuit of the computer of FIGURE 2;

FIGURE 7 is a circuit diagram of a peak-to-peak rectifier circuit of the amplifier circuit of FIGURE 6;

FIGURE 8 is a circuit diagram of a dither amplifier and phase detector circuit of the amplifier of FIGURE 2;

FIGURE 9 is a circuit diagram of a storage system used in conjunction with the computer in the color correction system of FIGURE 1; and FIGURE 10 is a circuit diagram of one of eight capacitor storage sections of the storage system of FIGURE 9.

FIGURE 1 diagrammatically illustrates a color correcting system 20 using a computer of this invention. It will be appreciated that the computer is usable in a variety of other applications.

The system 20 is used to produce negatives for plate making in color printing. In operation, an unexposed film is secured on the vertical face of a carrier 21 to be scanned by a spot of light produced by a light unit 22, while a print to be reproduced is secured on a carrier 23 to be scanned by a photoelectric unit 24, the intensity of the light from the unit 22 being controlled in accordance with signals from the photoelectric unit 24.

A line-by-line scan is used, the carriers 21 and 23 being supported for rapid horizontal back and forth movement on horizontal support and guide rods 25 and 26, while the light and photoelectric units 22 and 24 are moved vertically at a relatively slow rate by lead screws 27 and 28. The movements are synchronized, but may be of different amplitudes and velocities to permit size reduction or amplification. The back and forth movement of the carriers 21 and 23 are controlled by servo motors 29 and 30 while the lead screws are driven by control motors 31 and 32, all of the motors being connected to a scan control unit 33 as diagrammatically illustrated.

The photoelectric scan unit 24 comprises a light source used to illuminate a small spot of the color print, a prism for separating the light from the spot into eight spectral bands and eight photoelectric cells responsive to the light from the spot in the eight spectral bands, to produce eight electrical signals.

The eight spectral signals are amplified by a photoelectric signal circuit 34 and are applied through potentiometers of a computer 35 to a light control circuit 36 to control the intensity of the light of the unit 22.

Four sets of eight potentiometer units are provided in the computer 35, one for each of four colored inks used in a printing operation. A first set of potentiometer units designated as $X_1$–$X_8$ are used for exposure of a negative to be used in preparation of a plate for a first color of ink, units $X_9$–$X_{16}$ for the second color, units $X_{17}$–$X_{24}$ for the third color and units $X_{25}$–$X_{32}$ for the fourth color. The potentiometer sets are selectively connected between the photoelectric signal circuit and the light control circuit by means of a four position, sixteen pole switch 37 as diagrammatically illustrated.

To obtain optimum results, the potentiometer units must be set in accordance with the characteristics of the particular inks and paper to be used, and this is the function performed by the computer 35. The computer 35 obtains information as to the characteristics of the inks and paper to be used from a storage system 38, and automatically analyzes such information to set the potentiometers $X_1$–$X_{32}$ at the proper settings.

To obtain information as to the characteristics of the inks and paper, a preliminary procedure is followed in which eight samples of the inks on the paper to be used are placed on the carrier 23, eight spectral band output signals being developed by the photoelectric signal circuit 34 from each sample, for a total of 64 signals which are applied to the storage system 38. Such stored signals are read into the computer which then goes through an "off-line" computing operation to set each of the potentiometer units $X_1$–$X_{32}$ at the proper setting. The potentiometers may then be switched to an "in-line" operational mode to control the signals applied to the light control circuit and the intensity of the light developed from the unit 22 in accordance with signals obtained from the scanning of the color print.

Prior to the computing operation, information is read into the computer 35 from the storage system 38 to set the resistances of each of 64 potentiometer units in a manner described hereinafter in detail. These 64 units are designated as "A" units. Circuitwise, and for purposes of discussion, they may be considered as arranged in a matrix of eight horizontal rows and eight vertical columns, and the position of each "A" unit is indicated by a two digit subscript number, the first digit being the number of the row and the second digit being the number of the column. Thus unit $A_{37}$ is located in the third horizontal row and the seventh vertical column.

With reference to FIGURE 2, in the computing operation involving the first set of eight "X" units, the units $X_1$–$X_8$ respectively control voltages applied to eight vertical lines 41–48 which are respectively connected to terminals of the "A" units of the eight vertical columns. Thus line 41 is connected to terminals of the units $A_{11}$, $A_{21}$, $A_{31}$, etc. of the first column. The other terminals of the "A" units are connected to eight horizontal lines 51–58, the units $A_{11}$–$A_{18}$ of the first horizontal row being connected to line 51, etc. These eight horizontal lines 51–58 are connected through ganged switch contacts 61–68 to lines 71–78 respectively which are connected to eight inputs of an error amplifier circuit 79 and are also connected through a selector switch 80 and through adjustable potentiometers 81–88 to a terminal 89 to which a reference voltage is applied.

The mathematical problem involved in the operation of the computer is an eight equation simultaneous set or a matrix involving 64 non-zero positive coefficients, eight linear variables and eight constant terms. The equations may be considered to be in the following form:

$$a_{11}x_1 + a_{12}x_2 \ldots a_{18}x_8 - Em_1 = i_1$$
$$a_{21}x_1 + a_{22}x_2 \ldots a_{28}x_8 - Em_2 = i_2$$
$$a_{31}x_1 + a_{32}x_2 \ldots a_{38}x_8 - Em_3 = i_3$$
$$a_{41}x_1 + a_{42}x_2 \ldots a_{48}x_8 - Em_4 = i_4$$
$$a_{51}x_1 + a_{52}x_2 \ldots a_{58}x_8 - Em_5 = i_5$$
$$a_{61}x_1 + a_{62}x_2 \ldots a_{68}x_8 - Em_6 = i_6$$
$$a_{71}x_1 + a_{72}x_2 \ldots a_{78}x_8 - Em_7 = i_7$$
$$a_{81}x_1 + a_{82}x_2 \ldots a_{88}x_8 - Em_8 = i_8$$

These equations are in terms of current flow in the circuit. The "$a$" term represents the conductivity of the corresponding "A" potentiometer unit. Thus $a_{11}$ is the conductivity of the potentiometer unit $A_{11}$ etc. The "$x$" terms are the voltages applied from the "X" potentiometer units, $x_1$ being the voltage applied from potentiometer unit $X_1$, etc. The $Em_1$–$Em_8$ terms represent constant terms which are manually adjusted by adjustment of potentiometers 81–88 respectively, the values in this case being based on optimum or empirical results.

The terms $i_1$–$i_8$ are error currents representing the degree of unbalance of the equations and the signals applied to the error amplifier circuit 79. If all the equations are balanced or "solved," each of the terms $i_1$–$i_8$ would be zero.

In the general operation of the computer, an iterative operation is used. A signal is obtained representative of the total error and the $X_1$ unit is automatically adjusted to reduce the total error signal to a minimum. The $X_2$ unit is then adjusted to reduce the total error to a new minimum, etc. After adjustment of the $X_8$ unit, the $X_1$ unit may be again adjusted, etc. Such iterations are continued until the error signals are reduced to zero, or to values sufficiently small as to constitute a practical solution.

It may be noted that in the classical iterative method of the mathematical solution of matrix equations, $x_1$ would be first adjusted to reduce $i_1$ to zero, followed in like manner with $x_2$–$x_8$, reducing $i_2$–$i_8$ to zero in succession, to constitute an iteration. If the problem were "well conditioned," successive iterations of this type would cause the variables to converge toward their correct values. In general, this approach would require that the determinate of the matrix be large, a situation which is not true in the "ink matrix" operation for which the illustrated computer was designed, and a situation which is probably not true in a great many practical problems.

In the computer of this invention, each unit is adjusted to minimize the sum of the magnitude of the individual errors, rather than to minimize individual errors, and it is found that a typical ink matrix will converge and yield a solution.

After the first set of "X" units $X_1$–$X_8$ are set, the second set of units $X_9$–$X_{16}$ are switched into the computer circuit and the switch 80 is switched to another position to switch in another set of eight potentiometers like the potentiometers 81–88 into the circuit, set at different values in accordance with the characteristics of the second color to be printed. After adjustment of units $X_9$–$X_{16}$, the next set $X_{17}$–$X_{24}$ are switched in and adjusted, and finally the fourth set $X_{25}$–$X_{32}$. The computer is then ready for the in-line mode of operation to control the exposure of films to be used in production of the color plates.

As diagrammatically shown in FIGURE 3 the potentiometer unit $A_1$, which is the same as all other "A" units, comprises a resistance element 90 engaged by a movable contact 91. Physically, the element 90 is preferably of circular form with the contact being carried by a rotatable shaft (not shown) which is driven from a suitable drive source (also not shown) either in a clockwise direction by energization of a clutch 92 or in a counterclockwise direction by energization of a clutch 93.

One end of the element 90 is connected through a selector switch 94 either to a terminal 95 in the computing operation, or to a terminal 96 in the information read-in operation. The contact 91 and also the other end of the element 90 are connected to a terminal 97. One terminal of the clockwise clutch 92 and one terminal of the counter-clockwise clutch 93 are respectively connected to terminals 98 and 99, the other terminals of the clutches being connected to a terminal 100 which is connected to a power supply, not shown.

In the information read-in operation, the units are automatically adjusted in accordance with information read in from the storage system 38. In particular, the clutch terminals 98 and 99 are respectively connected to output terminals of ganged 64 position step switches 101 and 102, the inputs of which are connected to the output terminals of an error signal amplifier 103 having two inputs. One input of the error amplifier 103 is connected through another 64 position step switch 104 to a read-in cable 105 containing 64 conductors connected to capacitors in the storage system 38. The circuit of the storage system is described below in connection with FIGURES 9 and 10. The other input of the error signal amplifier 103 is connected through another 64 position step switch 106 to the terminal 96 of the potentiometer unit $A_1$. In the read-in operation, terminal 96 is connected to the potentiometer resistance element 90, and terminal 97 is connected through the line 51 and through switch contact 61 to a reference signal source 107.

In operation, if the resistance of the potentiometer is too high or too low in relation to the read-in signal, an error signal is developed which through the amplifier 103 energizes one of the clutches and drives the contact 91 in a direction to decrease or increase the resistance until a balance is achieved. The ganged switches 101, 102, 104 and 106 are then moved to a second position to adjust potentiometer unit $A_{12}$ while another signal is applied to the read-in line 105 from the storage system 38. This operation continues until all of the "A" potentiometer units are adjusted, and the system is then ready for the computing operation, the switch 94 of the unit $A_1$ being switched to connect to terminal 95 connected to line 41, and corresponding switches of the other "A" units being switched in similar fashion.

As diagrammatically shown in FIGURE 4, the potentiometer unit $X_1$, which is the same as all other "X" units, comprises a resistance element 108 engaged by a movable contact 109, element 108 being preferably of circular form with the contact 109 being carried by a rotatable shaft (not shown) which is driven from a suitable drive source (also not shown) either in a clockwise direction by energization of a clutch 110 or in a counterclockwise direction by energization of a clutch 111. One end of the element 108 is connected through a switch 112 either to a terminal 113 or a terminal 114. The other end of the element 108 is connected to a terminal which may be connected to ground or to a power supply terminal at a certain potential relative to ground. The movable center contact is connected through a switch 115, ganged to the switch 112, either to a terminal 116 or a terminal 117. Terminals 113 and 116 are connected in the computing operation and terminals 114 and 117 are used in the in-line operational mode.

One terminal of the clockwise clutch 110 and one terminal of the counterclockwise clutch 111 are connected to terminals 118 and 119, the other terminals of the clutches being connected to a terminal 120 which is connected to a power supply, not shown.

The clockwise and counterclockwise clutch terminals 118 and 119 of the $X_1$ unit, and similar terminals of the $X_2$–$X_{32}$ units are connected to ganged four position, eight pole switches 121 and 122 having eight conductor output lines connected through ganged eight position step switches 123 and 124 to output terminals of an amplifier 125. With the switches 121 and 122 in a first position, the switches 123 and 124 are stepped through eight positions to sequentially connect the amplifier 125 to the clutches of units $X_1$–$X_8$, the potentiometers being adjusted in each position of the step switches to reduce the error signals to a minimum value.

The switches 121 and 122 are then moved to a second position and the step switches 123 and 124 are again stepped through eight positions to sequentially connect the amplifier 125 to the clutches of units $X_9$–$X_{16}$, and so on, until all "X" units have been adjusted, whereupon the potentiometers may be switched to the in-line operational mode.

The amplifier 125 is a D.C. amplifier having an input responsive to a D.C. signal which may be either positive or negative. When the input signal is of one polarity and of sufficient amplitude, a current is applied through the switches to the clockwise clutch of a connected "X" unit, sufficient to engage the clockwise clutch and cause movement of the potentiometer thereof. When the input signal is of the reverse polarity and of sufficient magnitude, the counterclockwise clutch is engaged.

The input of amplifier 125 is connected to the output of a dither amplifier and phase detector 126 which in turn is responsive to the output of the error amplifier circuit 79. The term "dither" as used herein refers to the use of an A.C. signal applied between a "X" unit being adjusted and the "A" potentiometer matrix, to produce a signal in the output of the matrix which can be sensed in a manner such as to determine the direction in which the potentiometer of the "X" unit must be adjusted to bring the matrix closer to a solution. It forms a highly important feature of the invention.

In general, the dither circuit automatically performs the same operation as might be performed in manual adjustment of the potentiometer. If a potentiometer were manually moved slightly in one direction and it were observed that the error of the computer matrix were increased, then the potentiometer should obviously be moved in the opposite direction until a position is reached in which movement of the potentiometer in either direction increased the total error. The dither signal produces the same general effect as might be produced by a slight vibratory movement of the movable contact of a potentiometer. When the A.C. dither signal is applied, the output error signal will be either increased or decreased during one-half cycle thereof while being changed in the opposite direction during the opposite half cycle. By use of a phase detector, it is possible to sense the direction in which the potentiometer should be moved and to automatically move it in that direction.

The A.C. dither signal, which may be at a frequency of 15 cycles per second, is developed by a dither generator 127 having a pair of output terminals connected through conductors 128 and 129 to the dither amplifier and phase detector 126, and having another output terminal 130 connected through an eight position step switch to a selected one of eight conductors of a cable 132, connected to terminals 141–148 of a dither signal circuit 149. An adjustable phase shifter is preferably incorporated in the generator 127 to adjust the phase of the signal at terminal 130 in relation to the signal at terminals 128 and 129.

The circuit 149 has eight output terminals connected to the lines 41–48 of the "A" matrix. A four position, eight pole switch 150 connects eight input terminals 151–158 of the dither circuit to units $X_1$–$X_2$, units $X_9$–$X_{16}$, $X_{17}$–$X_{24}$, or $X_{25}$–$X_{32}$.

In the first position of the switch 159, input terminal 151 is connected to the terminal 116 of the $X_1$ unit, and terminals 152–158 are connected to like terminals of the units $X_2$–$X_8$, so as to be connected to the movable contacts of the potentiometers in the computing operation. At the same time, the terminal 113 of the unit $X_1$ and corresponding terminals of the units $X_2$–$X_8$ are connected together and through a four position switch 159 to a voltage supply circuit 160, which applies a certain D.C. voltage to the potentiometer units. At this time, the terminal connected to the right-hand end of the resistance elemen 108 (FIGURE 4) and similar terminals of the other units of the set may also be connected to a voltage supply circuit to have a certain voltage applied thereto, which may have a polarity opposite to that applied to the terminal 113.

As shown in FIGURE 5, the dither signal circuit 149 comprises eight transformers having primary windings 161–168 respectively connected between lines 141–148 and ground, and eight secondary windings connected between terminals 151–158 and the output terminals connected to lines 41–48.

With this arrangement and with the four position switches 150 and 151 and the eight position steps which are in the position thereof, a reference voltage is applied from the voltage supply circuit through the resistance elements of the potentiometer unit $X_1$–$X_8$ and to the vertical lines 41–48 of the "A" matrix, and a superimposed A.C. dither voltage is applied in series with the potentiometer unit $X_1$. The effect of the superimposed dither signal is sensed in the output to automatically move the potentiometer $X_1$ in the proper direction for solution of the matrix. After the potentiometer unit $X_1$ is adjusted, the eight position step switch 131 as well as the switches 122 and 124 ganged thereto are switched to a second position to adjust the unit $X_2$, and so on.

As shown in FIGURE 6, the error amplifier circuit 79 has eight inputs which are connected to the lines 71–78 with current-sensing resistors 171–178 being connected between the lines 71–78 and ground, to develop input voltages proportional to matrix output currents. In the computing operation lines 71–78 are connected through ganged switches 61–68 to the horizontal output lines 51–58 of the "A" matrix, and they are also connected through switch 80 to the set of adjustable "constant-turn" resistors 81–88, or to similar sets when the units $X_9$–$X_{16}$, $X_{17}$–$X_{24}$ or $X_{25}$–$X_{32}$ are being adjusted. It may be here noted that the values of the current-sensing resistors 171–178 and the values of the other components should be selected with regard to loading error effects. For example, the highest "$a$" value (sum of eight "$a$'s" in this case) must not appreciably affect the "$x$" and constant term currents and likewise, the value of the current-sensing resistors 171–178 must not appreciably affect the error currents.

The input voltages, which are proportional to the error currents, are applied to circuitry which functions to develop a signal representative of the total of the absolute values of the error current. In particular, the input voltages are applied to chopper circuits 181–188 which are connected to an A.C. source 189, having a frequency which is preferably substantially higher than the dither frequency. For example, a chopper frequency of 400 cycles per second may be used with a dither frequency of 15 cycles per second. The chopper circuits function to convert the error signals to A.C. signals which are of proportional magnitude and which are fed through 400 cycle band pass carrier amplifiers 191–198 to peak-to-peak rectifier circuits 201–208, which develop positive D.C. outputs proportional to the magnitudes of the respective error signals, independently of the sign or polarity of the error signals. The outputs of the rectifiers 201–208 are connected in series between ground and an output terminal 209 which is connected to the input of the dither amplifier and detector circuit 126.

As shown in FIGURE 7, the peak-to-peak rectifier 201 comprises a transformer having a primary 210 connected to the output of the band pass carrier amplifier 191 and a secondary winding 211 with a capacitor 212 thereacross, forming a circuit resonant at the chopper frequency. The voltage developed by this circuit is applied through a rectifier 213 to the parallel combination of a load resistor 214 and a filter capacitor 215. The output voltage is taken across the load resistor 214 and is proportional to the peak-to-peak value of the input signal. Since the transformer isolates the outputs from the inputs, the output voltages of all circuits can be connected in series, it being noted that rectifier circuits 202–208 are substantially identical to the rectifier circuit 201 shown in FIGURE 7.

The combination of the choppers and rectifiers in the error amplifier circuitry is highly advantageous, in developing an error signal representative of the total of the absolute values of the error currents. If, instead, an output error signal were developed proportional to the algebraic sum of the error currents, the operation would be very erratic and would not produce a solution to many practical problems. This is due to the fact that the algebraic sum of the errors may be quite low when, for example, there are two large errors or opposite signs, and in many cases, reducing the algebraic sum of the errors to zero might move the computer further away from a solution.

The illustrated error amplifier circuitry is also advantageous in that its operation is compatible with that of the dither circuitry. An A.C. signal of the dither frequency is superimposed on each D.C. error signal, and the output of each of the carrier amplifiers 195–198 is in the form of a modulated wave having an envelope corresponding to the dither component. After rectification by rectifiers 201–208, and filtering, eight signals are produced each having a D.C. component proportional to the absolute value of the corresponding error signal, and an A.C. dither component superimposed on the D.C. component. The amplitude of the dither component of each signal is proportional to a derivative of the individual error function, i.e. the ratio of a change in error to the corresponding change in the setting of the "X" unit being adjusted. The phase of the A.C. signal corresponds to the sign of the derivative. When such signals are combined, the result is a signal having a D.C. component proportional to the total error and an A.C. dither component having an amplitude proportional to the derivative of the total error function, and having a phase corresponding to the sign of that derivative.

The output signal from the error amplifier circuitry is applied to the dither amplifier and phase detector circuit which is shown in FIGURE 8. The signal is applied first through two twin-T filters 217 and 218, the first filter 217 being tuned to reject components of the chopper frequency (400 cycles) while the second is tuned to reject the second harmonic (30 cycles) of the dither signal (15 cycles). The output of the second filter 218 is fed to a band pass amplifier 219 tuned to the dither frequency (15 cycles), the output thereof being fed through another amplifier 220 to a phase splitter circuit 221 which develops two signals in 180° phase relation.

As shown, the phase splitter circuit 221 comprises a transistor 222 having a base electrode connected through capacitor 223 to the output of the amplifier 220, through a resistor 224 to ground and through a resistor 225 to a negative power supply terminal 226, an emitter connected through a resistor 227 to ground and a collector connected through a resistor 228 to the terminal 226. The resistors 227 and 228 are preferably of equal value to develop signals at the emitter and collector electrodes of equal magnitude but of opposite phase. These signals are applied through capacitors 229 and 230 and resistors 231 and 232 to circuit points 233 and 234 in a phase detector circuit 235, circuit points 233 and 234 being connected through resistors 237 and 238 to an output terminal 236 of the phase detector circuit, connected to the clutch control amplifier 125.

The phase detector circuit 235 is also coupled through conductors 128 and 129 to the dither generator 127, reference signals of opposite phase being applied thereto. In the general operation of the circuit, an output signal of one polarity is developed at the output terminal 236 when the input signals at circuit points 233 and 234 are in phase with the reference signals applied to conductors 128 and 129, and an output signal of the opposite polarity is developed when such signals are of the opposite phase relation.

In this circuit, circuit points 233 and 234 are connected through resistors 239 and 240 to ground. Circuit point 233 is connected to the collectors of a first pair of transistors 241 and 242 of opposite type and the circuit point 234 is connected to the collectors of another pair of transistors 243 and 244 of opposite type. The base electrodes of the transistors 241–244 are connected through resistors 245–248 to ground while the emitters are connected directly to ground.

During a first half cycle of the dither reference voltage, when the reference signal applied on conductor 128 is positive, and the reference signal on conductor 129 is negative, such signals are applied to resistors 249 and 250 to the base electrodes of the transistors 243 and 244 and are of such polarity as to permit heavy conduction thereof and as to provide an effective short circuit from circuit point 234 to ground, regardless of whether the signal applied thereto is positive or negative. At the same time, however, such signals are applied to the base electrodes of transistors 241 and 242 through resistors 251 and 252 and are of such polarity as to prevent such transistors from being conductive.

Accordingly, during the first half cycle, a signal will be developed at the output terminal 236 proportional to the voltage applied to circuit point 233 at that time and of the same polarity. During the second half cycle, a signal will be applied to the output terminal 236 proportional to the voltage applied to circuit point 234 at that time and of the same polarity. As a result, a form of full wave rectification of the signal from the phase splitter 221 is obtained, the output at terminal 236 having a polarity corresponding to the phase of the signal applied to the phase splitter 221.

The output signal at the terminal 236 is of course applied to the amplifier 125 to energize either the clockwise clutch or the counterclockwise clutch of the unit being adjusted, to move that unit in a direction to reduce the total error.

The signal from the error amplifier circuit 79 is applied to a control circuit 253. When the dither component drops to zero, or to a relatively low value, the control circuit operates to apply a signal to an operator 254 to step the ganged stepping switches 123, 124 and 131 to another position, whereupon another "X" unit is adjusted.

As above discussed, the output signal from the error amplifier circuit 70 has a D.C. component proportional to the total error. This signal is sensed in the voltage supply circuit 160 and when the total error is large, the voltage applied to the "X" unit is reduced to prevent overload paralysis effects. This total error signal may also be used to energize an appropriate signal or indicating device, not shown. It might also be used to cause automatic operation of an operator 255 to cause movement of the ganged switches 121, 122, 150 and 159 to another position. The operator 255 need not be automatic, of course.

FIGURE 9 is a diagrammatic illustration of the circuit of the storage system 38. As above noted, a preliminary procedure is followed in which eight samples of inks are placed on the carrier 23, with eight spectral band output signals being produced from each sample for a total of 64 signals which are stored in the storage system 38. Such stored signals are later read into the computer to set the 64 "A" units of the matrix, after which the computer goes into the "off-line" computing operation.

The eight spectral band output signals from the photoelectric signal circuit 34 are applied to eight amplifiers 261–268, which are preferably logarithmic amplifiers, the output voltages thereof being proportional to the logarithm of the input voltages. Such outputs are applied through adjustable resistors 271–278 to eight lines 281–288, resistors being connected between lines 281–288 and ground. Lines 281–288 are connected to eight capacitor storage circuits 301–308 each having eight capacitors therein. When a first ink sample is sensed, a step switch 309 operates to render the first storage circuit 301 operative and the eight spectral band signals are applied to the eight capacitors thereof. When the second sample is sensed, the eight spectral band signals are applied to the capacitors of the second circuit 302, and so on. For read-out, the capacitors are connected through the 64 conductor, read-in cable 105 to the 64 position step switch 104 (FIGURE 2) so that the capacitor voltages are sequentially applied to one input of the error signal amplifier 103, for setting the "A" potentiometer units.

FIGURE 10 shows the circuit of the capacitor storage circuit 301, it being understood that the circuit of the other units 302–308 are the same. As shown, the lines 281–288 are connected through relay contacts 311–318 to terminals of capacitor 321–328 and also to lines which are connected through the cable 105 to the step switch 104, the other terminals of the capacitors being grounded. The contacts 311–318 are operated by a relay coil 329, one terminal thereof being grounded and the other being connected to the step switch 309.

It will be understood that modifications and variations may be effected without departing from the spirit and scope of the novel concepts of this invention.

We claim as our invention:

1. In an analog computer, means for developing a plurality of equation unbalance error signals including a matrix of constant term units and a plurality of variable term units connected to said matrix of constant term units to apply variable voltages thereto, dither means associated with each of said constant term units for increasing and decreasing the voltages applied therefrom to said matrix at a certain rate, means responsive to said error signals to develop an output signal having a dither component varying at said certain rate, and phase detector means responsive to said dither component.

2. In an analog computer, means for developing a plurality of equation unbalance error signals including a matrix of constant term units and a plurality of variable term units connected to said matrix of consant term units, electromechanical means for adjusting each of said variable term units, means responsive to said error signals for developing an output signal representative of the total error, means responsive to said output signal for deriving a control signal for application to a selected one of said electro-mechanical means to adjust the corresponding variable term unit to a position in which said output signal is minimized, and step switch means arranged to apply said control signal to said electromechanical means in a certain sequence.

3. In an operational system including a plurality of inputs for receiving signals corresponding to the values of certain variables, a plurality of outputs for applying control signals to operating means, a computer including a matrix of constant term units and variable term units connected to said matrix of constant term units, means for automatically setting said constant term units in accordance with operating parameters of said system, said computer being arranged to develop a plurality of equation unbalance error signals, means responsive to said error signals for automatically setting said variable term units at positions at which said error signals are minimized, and means for thereafter switching said variable term units between said inputs and said outputs to control the relative effect of the signals from said inputs on said outputs.

4. In an analog computer, means for developing a plurality of equation unbalance error signals including a matrix of constant term units and a plurality of variable term units connected to said matrix of constant term units, an A.C. dither signal generator, means for applying a signal from said generator between a selected one of said variable term units and said matrix of constant term units, means for responding to said error signals to develop an output signal having an A.C. dither component, phase detector means responsive to said A.C. dither component of said output signal, and means for applying a reference signal from said dither signal generator to said phase detector.

5. In an analog computer, means for developing a plurality of equation unbalance error signals including a matrix of constant term units and a plurality of variable term units connected to said matrix of constant term units, dither means for increasing and decreasing at a certain rate the voltage applied from a selected one of said variable term units to said matrix of constant term units, means for converting each of said error signals to an A.C. signal having a frequency substantially higher than said dither signal rate and having an amplitude functionally related to the instantaneous magnitude of said error signal, rectifier means for converting each of said A.C. signals to an output signal having a D.C. component of fixed polarity and a superimposed A.C. dither component, a summing circuit for responding to said output signals to develop a total error signal having a D.C. component and a superimposed A.C. dither component, and means responsive to said A.C. dither component of said total error signal for adjusting said selected one of said variable term units.

6. In an analog computer, means for developing a plurality of equation unbalance error signals including a matrix of constant term units and a plurality of variable term units connected to said matrix of constant term units, a plurality of transformers having primary and secondary windings, each of said transformers being associated with one of said variable term units and having its secondary winding connected between said variable term unit and said matrix of constant term units, an A.C. dither signal generator, means for selectively applying a signal from said generator to the primary winding of the transformer associated with a selected one of said variable term units, and means responsive to A.C. dither components of said error signals to adjust said selected one of said variable term units.

7. In an operational system including a plurality of sensing means for developing signals corresponding to the values of certain operating variables, signal storage means, a plurality of logarithmic amplifiers for applying signals from said sensing means to said storage means, a computer for developing a plurality of equation unbalance error signals including a matrix of constant term units and variable term units connected to said matrix of constant term units, means for setting said constant term units in accordance with signals stored in said storage means, and means for thereafter adjusting said variable term units to minimize said error signals.

8. In an analog computer, means for developing a pluarlity of equation unbalance error signals including a matrix of constant term units and a plurality of variable term units connected to said matrix of constant term units, electromechanical means for adjusting each of said variable term units, means responsive to said error signals for developing an output signal representative of the total error, means responsive to said output signal for deriving a control signal for application to a selected one of said electromechanical means to adjust the corresponding variable term unit to a position in which said output signal is minimized, step switch means arranged to apply said control signal to said electromechanical means in a certain sequence, and a control circuit for automatically operating said step switch means when said output signal is minimized.

9. In an analog computer, means for developing a plurality of equation unbalance error signals including a matrix of constant term units and a plurality of variable term units connected to said matrix of constant term units to apply variable voltages thereto, electromechanical means for adjusting each of said variable term units, dither means for increasing and decreasing at a certain rate the voltage applied from a selected one of said variable term units to said matrix of constant term units, means responsive to said error signals to develop an output signal having a dither component varying at said certain rate, phase detector means responsive to said dither component to develop a control signal, control means for applying said control signal to the electromechanical means associated with said selected one of said variable term units, step switch means connecting said dither means and said control means to said variable term units and associated electromechanical means in a certain sequence, and means for initiating operation of said step switch means when said dither component drops below a certain value.

10. In a control system for apparatus wherein each of a first plurality of variables is affected in certain degrees by a second plurality of variables and wherein optimum operation is obtained by reducing to a minimum value the sum of the products of said first plurality of variables and certain factors, means for producing error signals corresponding to said products, means responsive to said error signals for developing an output signal representative of total error, dither means for increasing and decreasing said second plurality of variables at a certain rate to produce an A.C. dither component in said output signal, and phase detector means responsive to said dither component.

11. In a control system for apparatus wherein each of a first plurality of variables is affected in certain degrees by a second plurality of variables and wherein optimum operation is obtained by reducing to a minimum value the sum of the products of said first plurality of variables and certain factors, means for producing error signals corresponding to said products, means responsive to said error signals for developing an output signal representative of total error, dither means for increasing and decreasing a selected one of said second plurality of variables at a certain rate to produce an A.C. dither component for adjusting said selected one of said second plurality of variables.

References Cited by the Examiner
UNITED STATES PATENTS

| | | | |
|---|---|---|---|
| 2,543,650 | 2/1951 | Walker | 235—180 |
| 2,965,703 | 12/1960 | Laughlin | 235—179 X |
| 2,985,371 | 5/1961 | Landerer et al. | 235—180 |
| 3,032,269 | 5/1962 | Davidson | 235—180 |

MALCOLM A. MORRISON, *Primary Examiner.*